F. THOMAS.
MANIFOLDING SALES CHECK.
APPLICATION FILED JAN. 23, 1909.
937,658.
Patented Oct. 19, 1909.
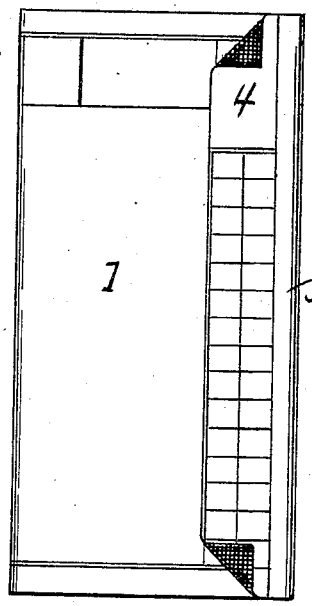
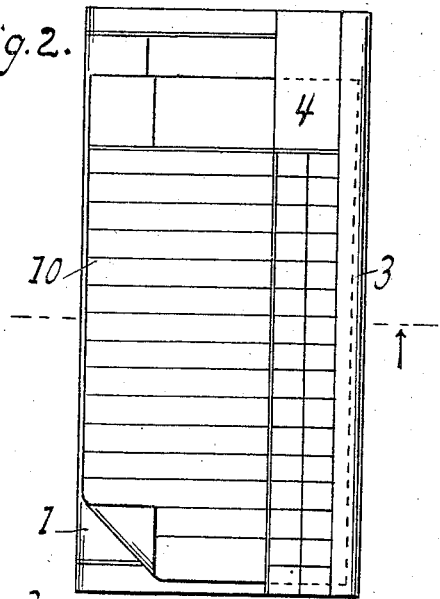
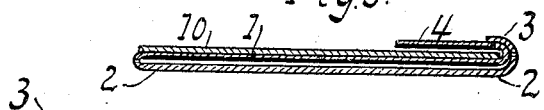
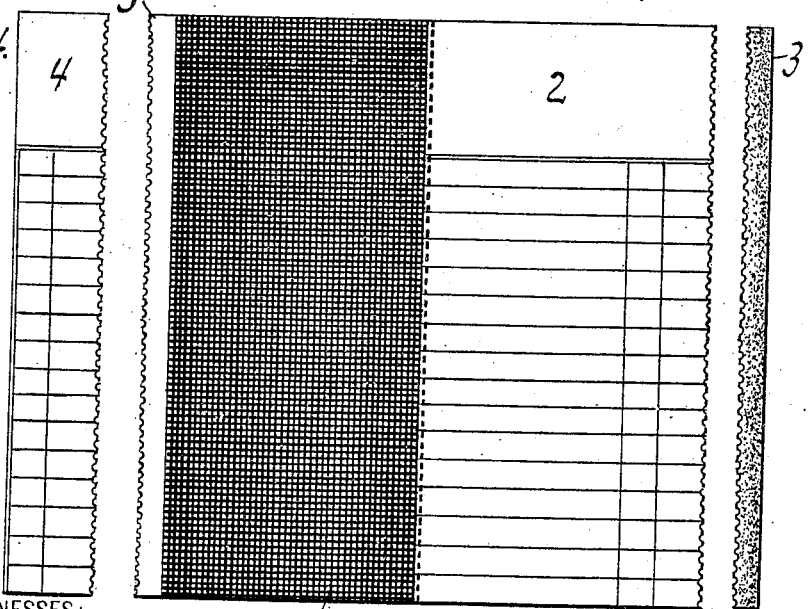
WITNESSES:
William Miller
Christian Almstaedt
INVENTOR
Frank Thomas
BY
Hauff + Warland
ATTORNEY

UNITED STATES PATENT OFFICE.

FRANK THOMAS, OF NEW YORK, N. Y.

MANIFOLDING SALES-CHECK.

937,658.  Specification of Letters Patent.  Patented Oct. 19, 1909.

Application filed January 23, 1909. Serial No. 473,884.

*To all whom it may concern:*

Be it known that I, FRANK THOMAS, a citizen of the United States, residing at New York, in the county of New York and State of New York, have invented new and useful Improvements in Manifolding Sales-Checks, of which the following is a specification.

This invention relates to improvements in manifolding sales checks of the kind set forth in U. S. Patent No. 905,606 of Dec. 1, 1908 and the object of the invention is to enable the function of checking to be accomplished in a quicker and safer way than in the case of said patented device as also to avoid the liability of errors.

This invention is set forth in the following specification and claim and illustrated in the annexed drawing in which:—

Figure 1 is a plan view of an envelop containing a sales check said envelop being closed and the extension folded over. Fig. 2 is a view like Fig. 1 with an order slip. Fig. 3 is a cross section of Fig. 2. Fig. 4 shows the envelop open and the extension detached.

This invention comprises an envelop or receptacle composed of two leaves 1 and 2. The leaf 1 has the extended portion 4 at one side thereof adapted to receive the prices of the articles which articles would be noted upon an order slip 10. In order to enable the price to be recorded simultaneously upon the envelop and upon the order slip the extended portion at one side of the envelop is folded over and the order slip is placed with the end or edge portion adapted to receive the purchase price under this folded over part of the envelop. This extended side portion 4 of the envelop is not necessarily one piece therewith but could be printed or formed as a separate piece. By having this improved flap or extended portion 4 the same can be turned over and the price will have to be written but once namely, on the extended portion. A suitable surface of transfer material on the extended portion of the envelop can be made to face the order slip if one is used and the extended portion when folded over will enable prices which are recorded on the extended portion to be recorded or reproduced in the proper manner on underlying parts. By one notation the prices can thus be recorded on the extended portion of the envelop as also upon the order slip if one is used and upon the check contained or printed in the envelop on the leaf 2 thereof. This construction or improvement allows quicker operation and avoids the probability of two items being copied one on top of the other inside the envelop. Such accident as the superposition of two items was liable to happen in the structure disclosed in applicant's aforesaid Patent 905,606. Such error would arise if a waiter or operator would forget to record the price the second time on the extended portion and would then turn in the order slip to the checker or cashier and subsequently enter upon a subsequent order slip a continuation of the order which had already been entered with its prices upon the first order slip. Using said new or subsequent order slip in connection with the same envelop check and extended portion and guided by the last entry the waiter would write one or more items or prices one on top of the other.

Inclosed in the envelop is a coating of transfer material to enable the order with prices which are marked upon the order slip and upon the folded extended portion of the envelop to be reproduced upon the check inclosed in such envelop.

Should the waiter or operator omit or forget to enter the purchase price at all such mistake would be discovered by the person authorized to receive the order slip so that the proper correction could be made. Furthermore the extended portion of the envelop folding over a portion of the order slip would insure the placing of such order slip onto an envelop so that notations would be made both on the extended portion and on the order slip as also on the check in the envelop and the controller or authorized receiver of the order slip would have in the latter an exact reproduction of the entries on the extended portion and upon the check.

The extended portion 4 can be connected by a rip line to an edge 3 which is adapted to co-act with the counter-edge 3 to seal or gum the edges of the envelop. When the extended portion is detached as indicated in Fig. 4 the edges 3 still adhering keep the envelop closed when handed to the customer who can then inspect the notations by opening the envelop in any desired manner. In case of short orders or where the whole order is given at once the order slip might be omitted and the orders and prices entered on the folded over portion.

What I claim is:—

In a manifolding device the combination of an envelop having a sales check therein and a reproducing material within the envelop in copying relation to the sales check whereby when the articles purchased and purchase price are recorded on an order slip on the outside of the envelop contiguous thereto, a copy is made on the sales check said envelop having an extended portion at one side thereof adapted to fold over an edge of the order slip to enable sales prices to be simultaneously recorded on the extended portion upon the order slip and upon the sales check, said extended portion having a transfer surface in position to overlie the price column of the order slip when said extended portion is folded.

In testimony whereof I have hereunto set my hand in the presence of two subscribing witnesses.

FRANK THOMAS.

Witnesses:
W. C. HAUFF,
CHRISTIAN ALMSTAEDT.